United States Patent
Joo

(10) Patent No.: US 7,586,399 B2
(45) Date of Patent: Sep. 8, 2009

(54) METHOD OF SETTING A TIME ALARM IN A MOBILE COMMUNICATION TERMINAL AND AN APPARATUS FOR IMPLEMENTING THE SAME

(75) Inventor: Sung Bum Joo, Seoul (KR)

(73) Assignee: LG Electronics Inc., Seoul (KR)

( * ) Notice: Subject to any disclaimer, the term of this patent is extended or adjusted under 35 U.S.C. 154(b) by 149 days.

(21) Appl. No.: 11/403,027

(22) Filed: Apr. 11, 2006

(65) Prior Publication Data

US 2006/0232388 A1 Oct. 19, 2006

(30) Foreign Application Priority Data

Apr. 14, 2005 (KR) .................. 10-2005-0031191

(51) Int. Cl.
*G08B 1/00* (2006.01)

(52) U.S. Cl. .............. 340/309.16; 340/309.7; 340/309.9; 368/21; 705/8

(58) Field of Classification Search ......... 340/309.16, 340/309.2, 309.7, 309.8, 7.58, 7.6, 7.61, 340/7.62; 455/422, 426, 440, 456
See application file for complete search history.

(56) References Cited

U.S. PATENT DOCUMENTS

| | | | | |
|---|---|---|---|---|
| 5,089,814 A | * | 2/1992 | DeLuca et al. | 340/825.49 |
| 6,198,696 B1 | * | 3/2001 | Korpi et al. | 368/21 |
| 6,950,662 B2 | * | 9/2005 | Kumar | 455/456.3 |
| 7,219,109 B1 | * | 5/2007 | Lapuyade et al. | 707/200 |
| 7,305,491 B2 | * | 12/2007 | Miller et al. | 709/248 |
| 2002/0038234 A1 | * | 3/2002 | Fu et al. | 705/8 |
| 2003/0054325 A1 | | 3/2003 | Miller et al. | |
| 2004/0075581 A1 | * | 4/2004 | Staniszewski | 340/932.2 |

FOREIGN PATENT DOCUMENTS

| | | |
|---|---|---|
| JP | 06-289164 | 10/1994 |
| JP | 10-213689 | 8/1998 |
| JP | 2001337182 | 12/2001 |
| JP | 2002094618 | 3/2002 |
| JP | 2002-207090 | 7/2002 |
| JP | 2002-290515 | 10/2002 |
| KR | 20020082615 | 10/2002 |
| KR | 2005-0031191 | 6/2005 |

* cited by examiner

*Primary Examiner*—Brent Swarthout
(74) *Attorney, Agent, or Firm*—Lee, Hong, Degerman, Kang & Waimey

(57) ABSTRACT

A method of setting a time alarm is disclosed in which a user can set a time alarm with reference to all cities around the world as well as a city to which the user is located. The present invention includes receiving a city selection and an alarm time, and outputting an alarm signal if the received alarm time corresponds with a current time of the received city.

15 Claims, 4 Drawing Sheets

FIG. 3

| Country(or City) | ◄ Seoul · Tokyo ► |
|---|---|
| Alarm Time | _____ : _____ |
| Alarm Interval | ◄ Once ► |
| Alarm Type | ◄ Basic tone ► |
| Alarm Forecast Interval | ◄ Every 20 minutes before 1 hour ► |

FIG. 4

| -10 | -9 | -8 | -7 | -6 | -5 | -4 | -3 | -2 | -1 | 0 | +1 | +2 | +3 | -20 | -19 | -18 | -17 | -16 | -15 | -14 | -13 | -12 | -11 |
|---|---|---|---|---|---|---|---|---|---|---|---|---|---|---|---|---|---|---|---|---|---|---|---|
| Madrid/London | Berlin/Rome/Paris | Cario | Baghdad | Teheran | Calcutta+30mins./Kalac | Rangoon+30mins. | Bangkok | Hong Kong/Beijing/Manila | Tokyo/Seoul | melbourne/Sydney | Okhotskoye | Wellington | Samoa/Midway | Honolulu | | Seattle/San Francisco | Phoenix/Denver | Mexico city/Chicago | Miami/New York | | Gusu Bay/Georgetown | Rio de Janeiro | |
| -10 | -9 | -8 | -7 | -6 | -5 | -4 | -3 | -2 | -1 | 0 | +1 | +2 | +3 | -20 | -19 | -18 | -17 | -16 | -15 | -14 | -13 | -12 | -11 |
| 14 | 15 | 16 | 17 | 18 | 19 | 20 | 21 | 22 | 23 | 0 | 1 | 2 | 3 | 4 | 5 | 6 | 7 | 8 | 9 | 10 | 11 | 12 | 13 |
| 15 | 16 | 17 | 18 | 19 | 20 | 21 | 22 | 23 | 0 | 1 | 2 | 3 | 4 | 5 | 6 | 7 | 8 | 9 | 10 | 11 | 12 | 13 | 14 |
| 16 | 17 | 18 | 19 | 20 | 21 | 22 | 23 | 0 | 1 | 2 | 3 | 4 | 5 | 6 | 7 | 8 | 9 | 10 | 11 | 12 | 13 | 14 | 15 |
| 17 | 18 | 19 | 20 | 21 | 22 | 23 | 0 | 1 | 2 | 3 | 4 | 5 | 6 | 7 | 8 | 9 | 10 | 11 | 12 | 13 | 14 | 15 | 16 |
| 18 | 19 | 20 | 21 | 22 | 23 | 0 | 1 | 2 | 3 | 4 | 5 | 6 | 7 | 8 | 9 | 10 | 11 | 12 | 13 | 14 | 15 | 16 | 17 |
| 19 | 20 | 21 | 22 | 23 | 0 | 1 | 2 | 3 | 4 | 5 | 6 | 7 | 8 | 9 | 10 | 11 | 12 | 13 | 14 | 15 | 16 | 17 | 18 |
| 20 | 21 | 22 | 23 | 0 | 1 | 2 | 3 | 4 | 5 | 6 | 7 | 8 | 9 | 10 | 11 | 12 | 13 | 14 | 15 | 16 | 17 | 18 | 19 |
| 21 | 22 | 23 | 0 | 1 | 2 | 3 | 4 | 5 | 6 | 7 | 8 | 9 | 10 | 11 | 12 | 13 | 14 | 15 | 16 | 17 | 18 | 19 | 20 |
| 22 | 23 | 0 | 1 | 2 | 3 | 4 | 5 | 6 | 7 | 8 | 9 | 10 | 11 | 12 | 13 | 14 | 15 | 16 | 17 | 18 | 19 | 20 | 21 |
| 23 | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
| 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 0 |
| 2 | 3 | 4 | 5 | 6 | 7 | 8 | 9 | 10 | 11 | 12 | 13 | 14 | 15 | 16 | 17 | 18 | 19 | 20 | 21 | 22 | 23 | 0 | 1 |
| 3 | 4 | 5 | 6 | 7 | 8 | 9 | 10 | 11 | 12 | 13 | 14 | 15 | 16 | 17 | 18 | 19 | 20 | 21 | 22 | 23 | 0 | 1 | 2 |
| 4 | 5 | 6 | 7 | 8 | 9 | 10 | 11 | 12 | 13 | 14 | 15 | 16 | 17 | 18 | 19 | 20 | 21 | 22 | 23 | 0 | 1 | 2 | 3 |
| 5 | 6 | 7 | 8 | 9 | 10 | 11 | 12 | 13 | 14 | 15 | 16 | 17 | 18 | 19 | 20 | 21 | 22 | 23 | 0 | 1 | 2 | 3 | 4 |
| 6 | 7 | 8 | 9 | 10 | 11 | 12 | 13 | 14 | 15 | 16 | 17 | 18 | 19 | 20 | 21 | 22 | 23 | 0 | 1 | 2 | 3 | 4 | 5 |
| 7 | 8 | 9 | 10 | 11 | 12 | 13 | 14 | 15 | 16 | 17 | 18 | 19 | 20 | 21 | 22 | 23 | 0 | 1 | 2 | 3 | 4 | 5 | 6 |
| 8 | 9 | 10 | 11 | 12 | 13 | 14 | 15 | 16 | 17 | 18 | 19 | 20 | 21 | 22 | 23 | 0 | 1 | 2 | 3 | 4 | 5 | 6 | 7 |
| 9 | 10 | 11 | 12 | 13 | 14 | 15 | 16 | 17 | 18 | 19 | 20 | 21 | 22 | 23 | 0 | 1 | 2 | 3 | 4 | 5 | 6 | 7 | 8 |
| 10 | 11 | 12 | 13 | 14 | 15 | 16 | 17 | 18 | 19 | 20 | 21 | 22 | 23 | 0 | 1 | 2 | 3 | 4 | 5 | 6 | 7 | 8 | 9 |

FIG. 5

| Selected City | Seoul | Alarm Time | 2:00 PM<br>January 14, 2006 |
|---|---|---|---|
| Reference City | New York | Local Alarm Time | 12:00 AM<br>January 14, 2006 |

METHOD OF SETTING A TIME ALARM IN A MOBILE COMMUNICATION TERMINAL AND AN APPARATUS FOR IMPLEMENTING THE SAME

CROSS-REFERENCE TO RELATED APPLICATIONS

This application claims the benefit of the Korean Patent Application No. 10-2005-0031191, filed on Apr. 14, 2005, which is hereby incorporated by reference as if fully set forth herein.

BACKGROUND OF THE INVENTION

1. Field of the Invention

The present invention relates to a method of setting an alarm, and more particularly, to a method of setting a time alarm in a mobile communication terminal and an apparatus for implementing the same. Although the present invention is suitable for a wide scope of applications, it is particularly suitable for setting a time alarm using the mobile communication terminal.

2. Discussion of the Related Art

Generally, a time alarm function is provided to a mobile communication terminal. A user can program an alarm to ring at a predetermined time set by the user using the time alarm function. A process of setting an alarm in a mobile communication terminal by a user, and a process of outputting an alarm ring from the mobile communication terminal are explained as follows.

First, a user selects a menu for setting an alarm from various menus provided in a mobile communication terminal. When the menu associated with setting the alarm is selected, the mobile communication terminal displays an input screen to allow the user to input an alarm time (and alarm interval) and an alarm ring type. The user then inputs the desired alarm time (and alarm interval) and the alarm ring type. Thereafter, when the inputted alarm time coincides with the actual time, the mobile communication terminal outputs the alarm sound or ring.

In the related art for setting an alarm in a mobile communication terminal, the time displayed on the mobile communication terminal indicates the current time with respect to the city where the mobile communication terminal is located. As such, the user is unable to set the alarm using the time of another city located in a different time zone. In other words, in the process of setting the time alarm, a user is allowed to select the alarm time (and alarm interval) and the alarm sound (or ring type) only and has no opportunity to select the alarm time associated with the actual time of another city.

In order for the user to set the alarm according to the time of the city in which the mobile communication terminal is located, the following process is required.

First, the user voluntarily calculates the time difference (e.g., 14 hour difference) between a current city and a different city. Thereafter, the user directly converts the alarm time (10:00 AM, Seoul) of the currently located city to the alarm time (02:00 PM, New York) of the different city using the calculated time difference. After the alarm time conversion is completed, the user executes a time alarm function of the mobile communication terminal to input the converted alarm time. Lastly, the mobile communication terminal activates an alarm sound or ring when the converted alarm time matches the actual time.

A problem associated with the conventional art is that, in order for the user to set the alarm using the time of a different city as a basis, the user has to manually execute the above-described procedures.

SUMMARY OF THE INVENTION

Accordingly, the present invention is directed to a method of time alarm and mobile communication terminal for the same that substantially obviate one or more problems due to limitations and disadvantages of the related art.

An object of the present invention is to provide a method of setting a time alarm in a mobile communication terminal and an apparatus for implementing the same, by which a user can set the time alarm with reference to not only a time of a current city but also a time of a selected city.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of setting a time alarm according to the present invention includes receiving a city selection and an alarm time and outputting an alarm signal if the alarm time corresponds with a current time of the received city.

In another aspect of the present invention, a mobile communication terminal is described which includes an input unit for inputting at least one city selection and at least one alarm time. The mobile communication terminal further comprises a memory for storing alarm information including the at least one inputted city selection and the at least one inputted alarm time, wherein each inputted city selection corresponds to the inputted alarm time, and a controller for controlling an output of an alarm signal if the at least one alarm time corresponds with a current time of the corresponding at least one inputted city selection. In addition, the mobile communication terminal comprises an output unit for outputting the alarm signal.

Yet, in another aspect of the present invention, a method of setting an alarm is described, which includes a mobile communication terminal for receiving at least one city selection and an alarm time, and outputting an alarm signal for each city when the received alarm time corresponds with a current time of the received at least one city selection, wherein the alarm is a time-based alarm.

In a further aspect of the present invention, the mobile communication terminal receives a city selection and at least one alarm time and outputs an alarm signal for each alarm time when the received at least one alarm time corresponds with a current time of the received city selection, wherein the alarm is a time-based alarm.

In another aspect of the present invention, the mobile communication terminal receives at least one city selection and at least one alarm time, wherein the each city selection corresponds with the alarm time and outputs an alarm signal when the received at least one alarm time corresponds with a current time of the corresponding at least one received city selection, wherein the alarm is a time-based alarm.

Yet, in another aspect of the present invention, the mobile communication terminal comprises an input unit for inputting at least one city selection and an alarm time, a memory for storing alarm information including the at least one inputted city selection and the inputted alarm time, a controller for controlling an output of an alarm signal if the alarm time corresponds with a current time of the at least one inputted city selection, and an output unit for outputting the alarm signal.

In a further aspect of the present invention, the mobile communication terminal comprises an input unit for inputting a city selection and at least one alarm time, a memory for storing alarm information including the inputted city selection and the at least one inputted alarm time, a controller for controlling an output of an alarm signal if the at least one alarm time corresponds with a current time of the inputted city selection, and an output unit for outputting the alarm signal.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 3 is an exemplary diagram of a time alarm setting page used in a method of time alarm according to the present invention;

FIG. 4 is an exemplary diagram of time difference information between cities used in a method of time alarm according to the present invention; and FIG. 5 is an exemplary table of a set alarm time according to a standard time of a set city and a local alarm time according to a standard time of a reference city.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
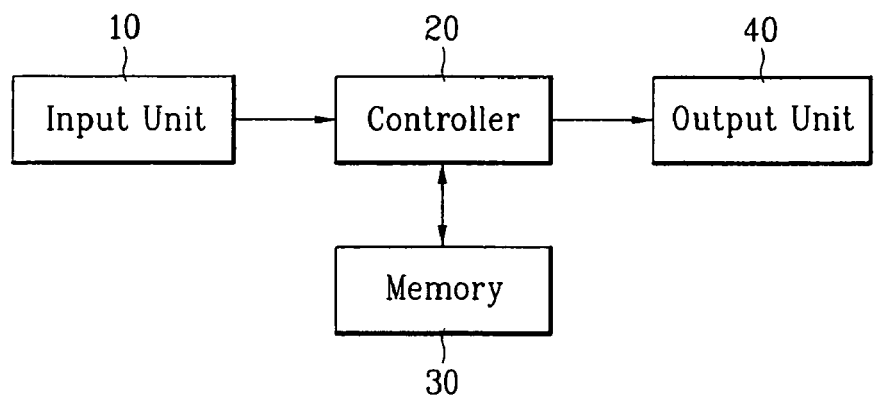
FIG. 1 is a block diagram of a mobile communication terminal according to the present invention.

FIG. 1 is a block diagram of a mobile communication terminal according to the present invention.

Referring to FIG. 1, a mobile communication terminal according to the present invention includes an input unit 10, a controller 20, a memory 30 and an output unit 40.

The input unit 10 is used to input information pertaining to a city and alarm time. Here, the input unit 10 can be used to input more than two selections of cities and more than two alarm times. Furthermore, the input unit 10 is used to input an alarm interval, an alarm forecast interval and an alarm type. The alarm type is not limited to sound, music, ring tone, bell, and buzz, vibration, flickering light, display light, to name a few.

Meanwhile, in a case where one country is represented by one standard time, the city should be construed as including the country. Hereafter, the standard time can be used to represent the time of the corresponding city or country.

In detail, the alarm time is set with reference to the time (i.e., standard time) of a selected city, and the alarm interval refers to a temporal interval or period by which an alarm is to be executed. For instance, the alarm interval includes 'once,' 'everyday,' 'Monday to Friday of each week' and the like. Moreover, the alarm forecast means that the alarm time is forecasted prior to the alarm time, and the alarm forecast interval refers to a temporal interval or period by which the alarm forecast should be executed. For instance, the alarm forecast interval includes, with respect to the alarm time, 'once 10 minutes prior to the alarm time,' 'every 20 minutes 1 hour before the alarm time,' 'every 1 hour one day before the alarm time' and the like. The alarm signal associated with the selected alarm type is outputted via a speaker. A user can select one of alarm types, including ring tones and sounds, previously stored in the memory 30 of the mobile communication terminal via the input unit 10 or can directly input the alarm type via the input unit 10.

The controller 20 controls an output of alarm when the alarm time, which is set by the user, equals the time of the selected city.

In order to distinguish the city inputted via the input unit 10 from a reference city, the inputted city can be referred to as a selected city. Here, the 'selected city' is a city inputted by the user and the 'reference city' is the city where the user or mobile communication terminal is currently located.

Moreover, the alarm time with reference to the time of a selected city can be referred as a 'set alarm time,' and the alarm time with reference to the time of the reference city can be referred to as the 'local alarm time.'

Preferably, after the controller 20 receives a selection of a city via the input unit 10, the controller 20 displays a time of the city, i.e., the selected city on a display of the output unit 40. In this case, the time of the selected city can be calculated using information of time difference between the cities (e.g., a table index containing time difference of major cities) based on a time difference between the time of the selected city and the reference city and the current time of the reference city. Hereafter, the information of the time difference between the cities can be referred to as an inter-city time difference information.

Preferably, after a city and an alarm time are inputted via the input unit 10, the controller 20 converts the alarm time to a local alarm time using the time of the reference city and then stores the converted local alarm time in the memory 30. Since the local alarm time is converted with reference to the time of the reference city, when the alarm time equals or corresponds to the current time of the selected city, the controller 20 outputs the alarm signal. Hereafter, the alarm signal is associated with an alarm type selected by a user which is transmitted to an output unit 40 of a mobile communication terminal for outputting to the user according to the selected alarm type. The output unit 40 can manifest the alarm signal in forms of sound, music, buzz, ring, display light, bell, etc. Thus, the object of converting the alarm time to the local alarm time is to determine whether the time of the reference city corresponds to the converted local alarm time. Substantially, the object is to compare the local alarm time to the current time received from a mobile communication system to which the mobile communication terminal belongs.

In particular, after a city and an alarm time are inputted via the input unit 10, the controller 20 inquires a time difference between a time of a city and a time of a reference city (or current time) using the inter-city time difference information stored in the memory 30. The controller 20 converts the alarm time to a local alarm time with reference to the time of the reference city and then stores the local alarm time in the memory 30. Since the local alarm time is converted with reference to the time of the reference city, when the alarm time equals the current time of a reference city, the controller 20 outputs an alarm signal. Here, a decision as to whether the alarm time corresponds or equals the time of the selected city can be made based on whether the local alarm time equals the current time of the reference city.

Meanwhile, the determination regarding whether the local alarm time equals or corresponds to the time of the reference city is made based on the current time received from the mobile communication system to which a mobile communication terminal belongs. For instance, if the selected city is 'Seoul,' the alarm time is '2 PM on January 14, ' and the reference city is 'New York', the time difference between the times of 'Seoul' and 'New York' can be sought or inquired using the inter-city time difference. For example, since the time of New York is 14 hours behind that of Seoul, the alarm time of the selected city 'Seoul' (e.g., 2 PM on January 14) is converted to the local alarm time of the reference city 'New York' (e.g., 12 AM on January 14) using the time difference (e.g., 14 hours). The local alarm time is then stored in the memory 30. Thereafter, if the time of New York reaches or equals the converted local alarm time, the alarm signal is outputted. Here, based on whether the local alarm time corresponds to the time of New York, a determination is made as to whether the time of the selected city 'Seoul' has reached or corresponds with the alarm time (2 PM on January 14).

In addition, if the alarm interval (or alarm forecast interval) is received via the input unit 10, the controller 20 outputs the alarm signal when the time of the selected city reaches or equals the time corresponding to the alarm time or alarm interval (or alarm forecast interval).

Furthermore, if the mobile communication terminal receives more than one city selection (e.g., a first city and a second city) via the input unit 10, the controller 20 controls the alarm signal output with respect to the current time of the second city. In this example, the first city can be the selected city and the second city can be the reference city. Alternatively, if the mobile communication terminal receives more than one alarm time (e.g., a first alarm time and a second alarm time) via the input unit 10, the controller 20 controls the alarm signal output based on the current time of the city. Alternatively, if the mobile communication terminal receives at least two city selections (e.g., a first city and a second city) and corresponding at least two alarm times (e.g., a first alarm time and a second alarm time) via the input unit 10, the controller 20 controls the alarm signal output based on the current time the second city reaches or corresponds with the second alarm time.

The memory 30, in which the inter-city time difference is stored in advance, is a storage device for storing alarm information including a city, alarm time, alarm interval, alarm forecast interval, alarm type (including sound), and a local alarm time. The inter-city time difference information provides time differences with other cities with respect to a specific city.

Furthermore, the output unit 40 is an output device that outputs an alarm type and can also include, but not limited to, a speaker and a display.

Figure 2:
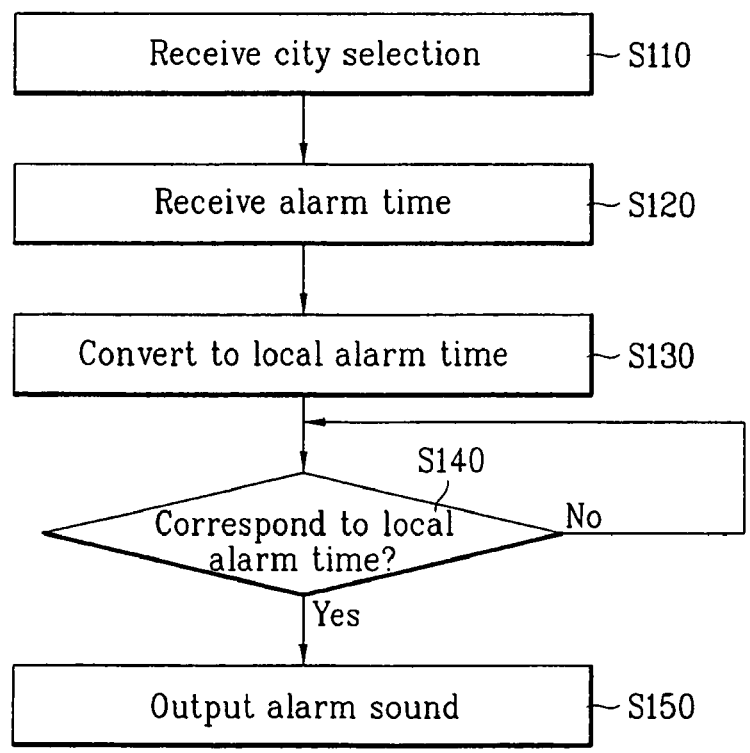
FIG. 2 is a flowchart of a method of time alarm according to the present invention.

FIG. 2 is a flowchart illustrating a method of setting a time alarm according to the present invention.

Referring to FIG. 2, first of all, a user executes 'time alarm' menu among various menus of a mobile communication terminal to set a time alarm.

The mobile communication terminal displays a time alarm setting page to allow the user to input a selection for setting the time alarm. FIG. 3 shows an example of a time alarm setting page used in a method of setting the time alarm according to the present invention.

Referring to FIG. 2, the user selects a specific city from the cities throughout the world using an input unit of a mobile communication terminal. After selecting a specific city, the mobile communication terminal receives data of the city selected by the user (S110). Here, the mobile communication terminal can display a time of the selected city in the step S110. In particular, the mobile communication terminal checks for a time difference (e.g., Seoul is 14 hours ahead of New York) between the time of the selected city (e.g., Seoul) and the time of the reference city (e.g., New York). Thereafter, the mobile communication terminal calculates the time (e.g., 6:15 AM on Jan. 13, 2006) of the selected city (e.g., Seoul) based on the time difference and the current time (e.g., 4:15 PM on Jan. 12, 2006) of the reference city. As described above, the mobile communication terminal can display the calculated time via a display. Thus, by displaying the time of the selected city after the step S110, the user can be informed of the time difference between the selected city and the reference city in which the user is currently located.

If the user selects via the input unit an alarm time based on the time of the city selected in the step S110, the mobile communication terminal receives alarm time data selected by the user (S120). Here, the alarm time may correspond to a specific time and date (e.g., 2 PM on Jan. 14, 2006) or an unspecific time and date (e.g., 10 AM). If the alarm time corresponds to the unspecific time and date, the user can select an alarm interval in the step S120, and the mobile communication terminal receives the alarm interval as well as the alarm time. Furthermore, in the step S120, the user can select an alarm forecast interval, and the mobile communication terminal can further receive the alarm forecast interval. Optionally, in the step S120, the user can select an alarm type, and the mobile communication terminal can further receive the alarm type.

Alternatively, since no limitation is put on the sequence between the step S110 and the step S120, the step S110 can be executed after completion of the step S120.

Once the user completes the selection of the time alarm through the steps S110 and S120, the mobile communication terminal converts the selected alarm time to the local alarm time of the reference city (S130). Again, the reference city refers to the city where the mobile communication terminal is located. In the step S130, the inter-city time difference information is used to determine the time difference between the time of the selected city and the time of the reference city.

An example of the inter-city time difference information used in the method of setting the time alarm according to the present invention is shown in FIG. 4. For instance, if the selected city is 'Seoul' and the reference city is 'New York', the time difference between 'Seoul' and 'New York' is determined using the inter-city time difference information (e.g., New York is 14 hours behind Seoul). Subsequently, the alarm time of the selected city is converted to the local alarm time of the reference city using the time difference.

In addition, for instance, if the time difference indicates that 'New York is 14 hours behind Seoul', such a time difference is used to convert the alarm time (e.g., 2 PM on Jan. 14, 2006) of the reference city (e.g., Seoul) to the local alarm time (e.g., 12 AM on Jan. 14, 2006). Examples of an alarm time according to a time of a selected city and a local alarm time according to a time of a reference city are shown in FIG. 5.

When the conversion of the local alarm time is completed in the step S130, it is preferable that information on the city, the alarm time, the local alarm time, the alarm interval, the alarm forecast interval, and the alarm type are stored. In review, the user selects the information necessary for setting the time alarm in the steps S110 and S120, and the mobile communication terminal stores the information for setting the time alarm in the step S130, whereby the process of setting the time alarm is completed.

Referring to FIG. 2, after the process of setting the time alarm is completed, a determination is made as to whether the time of the reference city has reached or corresponds to the local alarm time (S140). Preferably, the determination as to whether the local alarm time equals the time of the reference city is made based on the current time received from the mobile communication system to which the mobile communication terminal belongs.

For instance, if the reference city is 'New York' and the local alarm time is set to '12 AM on Jan. 14, 2006', the current time is compared to the local alarm time to determine whether the local alarm time corresponds to the current time. Here, the current time is received from the mobile communication system of 'New York' to which the mobile communication terminal belongs.

In a case where the alarm interval is further received in the step S120, the step S140 may be used to determine whether the current time corresponds to the alarm time and the alarm interval based on the time of the selected city. Furthermore, whether the time corresponds to the alarm time and the alarm interval of the selected city depends on whether the current time of the reference city has reached or corresponds to the local alarm time and alarm interval. For instance, if the reference city is 'New York,' the local alarm time is '12 AM on Jan. 14, 2006,' and the alarm interval is set to 'everyday,' the current time received from the mobile communication system of the 'New York' area to which the mobile communication terminal belongs is used to determine whether the current time is 12 AM on Jan. 14, 2006.

In a case where the alarm forecast interval is further received in the step S120, the step S140 may be used to determine whether the current time corresponds to the alarm time and the alarm forecast interval based on the time of the selected city. Furthermore, whether the time corresponds to the alarm time and the alarm forecast interval of the selected city depends on whether the current time of the reference city corresponds to the local alarm time and alarm forecast interval. For instance, if the reference city is 'New York,' the local alarm time is '12:00 AM on Jan. 14, 2006, ' and the alarm forecast interval is 'every 20 minutes before 1 hour,' the current time received from the mobile communication system of the 'New York' area to which the mobile communication terminal belongs is used to determine whether the current time corresponds to 11:00 PM, 11:20 PM, or 11:40 PM on Jan. 13, 2006.

Based on the determination in the step S140, if the current time corresponds to the local alarm time, corresponds to the alarm time and the alarm interval, or corresponds to the alarm time and the alarm forecast interval (example in the step S140), it can be considered that the alarm time (or time corresponding to alarm time, alarm interval, or alarm forecast interval) is set based on the time of the selected city. Consequently, an alarm ring or tone is then outputted (S150). If the alarm type is selected by the user in the step S120, the selected alarm type in a form of ring or tone is outputted. To output the alarm ring, for example, the alarm ring can be outputted through a speaker or alternatively, a lamp of the display can be flickered.

Accordingly, the present invention provides the following effects or advantages.

First, a user can set a time alarm with respect to not only in the city to which the user is located but also with reference to all cities around the world.

Second, if the user sets a time alarm with reference to a city to which the user does not belong, it is unnecessary for the user to determine a time difference or to manually calculate a local alarm time.

Third, the user can set a time alarm for multiple cities. Alternatively, the user can set multiple time alarms for a single city (or country). In addition, the user can also set multiple time alarms corresponding to multiple cities.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of setting an alarm, comprising:
providing an alarm setting menu on a terminal display;
receiving a country selection in the alarm setting menu from an input interface;
receiving a city selection and an alarm time via the same interface in the alarm setting menu, wherein the city selection menu is provided after a country is selected in the alarm setting menu;
displaying a time difference with a controller between the selected city and a reference city; and
outputting an alarm signal with said controller if the received alarm time corresponds with a current time of the selected city, wherein the alarm is a time-based alarm.

2. The method of claim 1, further comprising displaying the time of the selected city.

3. The method of claim 2, wherein in receiving the city selection, the time of the selected city is displayed by calculating a current time of the reference city into the time of the selected city based on time difference information between the reference city and the selected city.

4. The method of claim 2, wherein the alarm time is selected after the time of the received city has been displayed.

5. The method of claim 1, wherein the alarm time corresponds to a specific time and date or an unspecific time and date.

6. The method of claim 1, further comprising receiving an alarm interval wherein the alarm signal is outputted according to the received alarm time and the received alarm interval with reference to the current time of the selected city.

7. The method of claim 1, further comprising receiving an alarm forecast interval wherein the alarm signal is outputted according to the received alarm time and the received alarm forecast interval with reference to the time of the selected city.

8. The method of claim 1, further comprising:
receiving at least one additional city selection; and
outputting the alarm signal when the received alarm time corresponds to a current time of the at least one additional selected city.

9. The method of claim 1, further comprising:
receiving at least one additional alarm time; and
outputting the alarm signal when the at least one additional alarm time corresponds to the current time of the selected city.

10. The method of claim 1, further comprising receiving an alarm type in receiving the alarm time, wherein the alarm signal is outputted according to the received alarm type.

11. The method of claim 1, wherein outputting the alarm signal comprises:
   converting the alarm time to a local alarm time in reference to a time of a reference city; and
   outputting the alarm signal if the local alarm time corresponds to the time of the reference city.

12. The method of claim 11, wherein converting the alarm time to the local alarm time in reference to the time of the reference city further comprises:
   determining a time difference between the time of the selected city and the time of the reference city; and
   converting the alarm time to the local alarm time in reference of to the time of the reference city using the determined time difference.

13. The method of claim 3, wherein a mobile communication terminal in which the alarm is set is located in the reference city.

14. The method of claim 11, wherein whether the Local alarm time corresponds to the time of the reference city is determined based on a current time received from a mobile communication system to which a mobile communication terminal belongs.

15. The method of claim 1, wherein the alarm signal is a signal associated with an alarm type selected by a user which is transmitted to an output unit of a mobile communication terminal for outputting to the user according to the selected alarm type.

* * * * *